US011599532B1

(12) United States Patent
Khan et al.

(10) Patent No.: US 11,599,532 B1
(45) Date of Patent: Mar. 7, 2023

(54) SYSTEM, METHOD, AND COMPUTER PROGRAM FOR PREVENTING USER MISTAKES WHEN MAKING DATABASE CHANGES

(71) Applicant: Amdocs Development Limited, Limassol (CY)

(72) Inventors: Vaseem Khan, Pune (IN); Saurabh Gour, Pune (IN); Nikhilesh Yadav, Barwani (IN); Dinesh Bansal, Pune (IN); Gaurav Patel, Savoy, IL (US); Anil Kumar, Pune (IN); Pradeepta Dinda, Pune (IN)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 17/400,012

(22) Filed: Aug. 11, 2021

(51) Int. Cl.
*G06F 16/242* (2019.01)
*G06F 16/21* (2019.01)

(52) U.S. Cl.
CPC .......... *G06F 16/2423* (2019.01); *G06F 16/21* (2019.01); *G06F 16/2435* (2019.01)

(58) Field of Classification Search
CPC .................................................. G06F 16/2423
See application file for complete search history.

(56) References Cited

U.S. PATENT DOCUMENTS

| 7,716,215 | B2 | 5/2010 | Lohman et al. | |
|---|---|---|---|---|
| 7,958,159 | B1* | 6/2011 | Tran | G06F 16/24564 707/634 |
| 8,214,382 | B1* | 7/2012 | Biere | G06F 16/245 707/769 |
| 9,495,356 | B2* | 11/2016 | Farahbod | G06F 16/83 |
| 2002/0156756 | A1* | 10/2002 | Stanley | G06F 16/20 706/47 |
| 2006/0022048 | A1* | 2/2006 | Johnson | H04M 3/4878 707/E17.117 |
| 2009/0100518 | A1* | 4/2009 | Overcash | G06F 21/552 726/22 |
| 2009/0138313 | A1* | 5/2009 | Morgan | H05K 7/20836 705/7.23 |
| 2012/0239612 | A1* | 9/2012 | George | G06F 16/254 707/602 |

(Continued)

FOREIGN PATENT DOCUMENTS

| CN | 107885869 A | 4/2018 |
|---|---|---|
| CN | 108415991 A | 8/2018 |
| CN | 110968601 A | 4/2020 |

OTHER PUBLICATIONS

Anonymous, "Oracle SQL Developer," Wikipedia, Jun. 1, 2021, 5 pages, retrieved from https://en.wikipedia.org/wiki/Oracle_SQL_Developer.

(Continued)

*Primary Examiner* — Robert W Beausoliel, Jr.
*Assistant Examiner* — Nirav K Khakhar
(74) *Attorney, Agent, or Firm* — Zilka-Kotab, P.C.

(57) ABSTRACT

As described herein, a system, method, and computer program are provided for preventing user mistakes when making database changes. In use, a user command to modify a database is received. The user command is validated against a plurality of predefined business rules. One or more actions are conditionally performed before executing the user command, based on a result of the validating.

20 Claims, 18 Drawing Sheets

(56) References Cited

U.S. PATENT DOCUMENTS

2017/0052652 A1* 2/2017 Denton ............... G06F 16/9535
2018/0032404 A1* 2/2018 Komatsu ............. G06F 11/1458
2021/0056095 A1* 2/2021 Srivastava .......... G06F 16/2379
2022/0100887 A1* 3/2022 Wu ..................... G06F 16/2455

OTHER PUBLICATIONS

Anonymous, "Toad (software)," Wikipedia, May 21, 2021, 3 pages, retrieved from https://en.wikipedia.org/wiki/Toad_(software).

* cited by examiner

FIG. 3I

SYSTEM, METHOD, AND COMPUTER PROGRAM FOR PREVENTING USER MISTAKES WHEN MAKING DATABASE CHANGES

FIELD OF THE INVENTION

The present invention relates to database management.

BACKGROUND

Oftentimes, databases are managed by users, and as a result are subject to manual changes which can introduce errors or other unwanted/unintended effects. For example, when a user desires to make a change to a database in a production environment, the user must type a Structured Query Language (SQL) statement or other database language statement. If the statement, which may otherwise be a valid statement, contains an error with regard to the desired change the user is trying to make, a resulting change to the database will reflect that error. As another example, even though a user may correctly enter the statement, the user may not understand an actual impact of the statement on the database. In this case where the user's desired impact differs from the actual impact, the resulting change to the database will reflect an unwanted effect.

To date, while database statements may be checked for validity, such as whether the statements use a correct syntax, there is currently no tool to verify that the actual changes being made to a database are the changes intended by the user. There is thus a need for addressing these and/or other issues associated with the prior art.

SUMMARY

As described herein, a system, method, and computer program are provided for preventing user mistakes when making database changes. In use, a user command to modify a database is received. The user command is validated against a plurality of predefined business rules. One or more actions are conditionally performed before executing the user command, based on a result of the validating.

DETAILED DESCRIPTION

Figure 1:
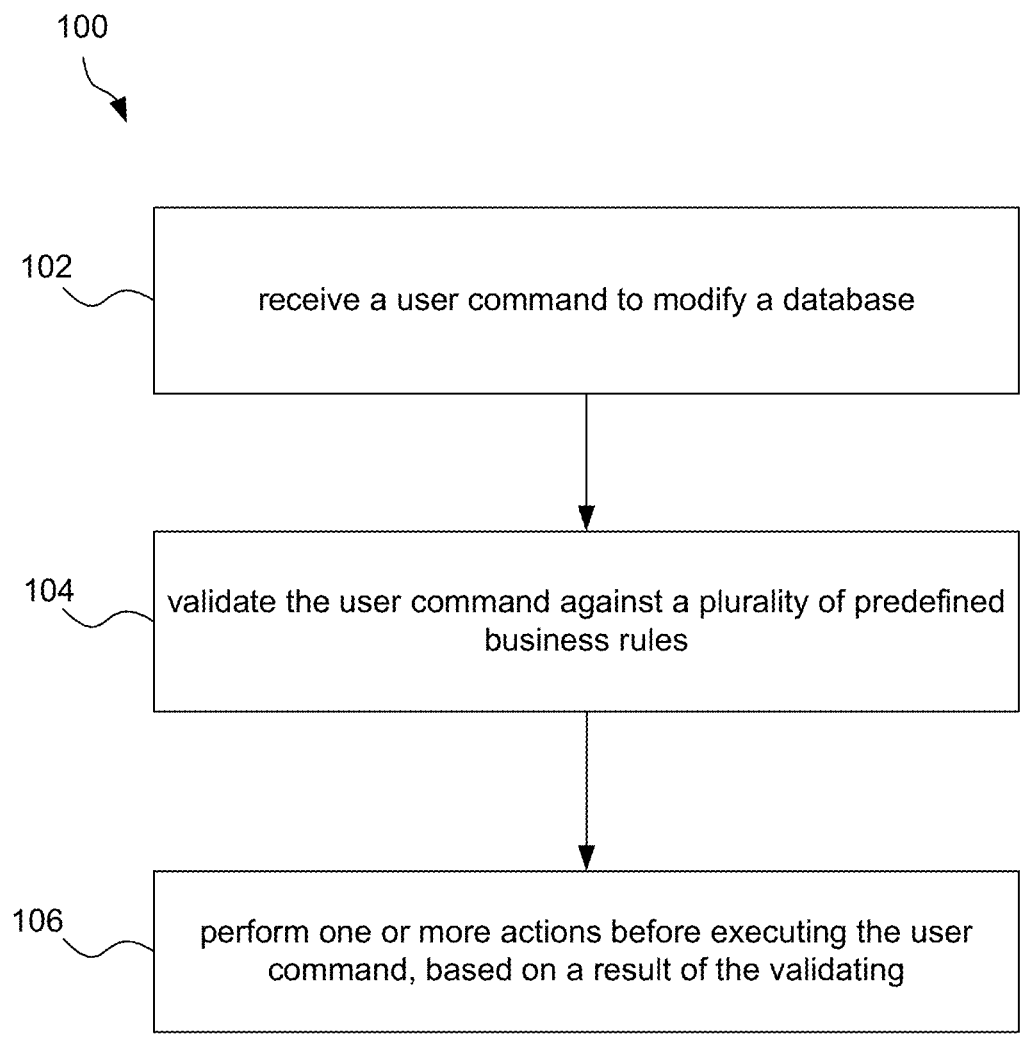
FIG. 1 illustrates a method for preventing user mistakes when making database changes, in accordance with one embodiment.

FIG. 1 illustrates a method 100 for preventing user mistakes when making database changes, in accordance with one embodiment. The method 100 may be performed by any computer system, such as those described below with respect to FIGS. 4 and/or 5. For example, the method 100 may be performed by a computer system that provides a database management tool for managing a database. The database may be local or remote with respect to the computer system performing the method 100.

In operation 102, a user command to modify a database is received. The user command may be received through a GUI. For example, the GUI may be included in database management tool mentioned above, in one embodiment.

In the context of the present description, the user command may be any input provided by a user for the purpose of modifying (e.g. updating, deleting, selecting, etc.) at least a portion of a database. For example, the user command may be in the form of one or more Structured Query Language (SQL) statements, such as a Data manipulation language (DML) statement that includes a sequence of one or more SQL statements that are treated as a unit such that either all of the statements are performed, or none of them are. To this end, the user command may indicate the database, table, rows, etc. to be modified as well as the particular modification to be performed.

In operation 104, the user command is validated against a plurality of predefined business rules. With respect to the present description, validating the user command may refer to any check of the user command against the predefined business rules. For example, the validating may determine whether the user command complies with the predefined business rules.

The predefined business rules may indicate any conditions, requirements, or other parameters for user commands that are defined in advance and that are separate from syntax-based requirements of the underlying database system. As an option, a syntax of the user command may be validated before validating the user command against the predefined business rules. For example, the user command may be verified as complying with the syntax-based requirements of the underlying database system prior to validating the user command against the predefined business rules.

In one embodiment, one or more of the predefined business rules may be defined (e.g. configured, customized etc.) by an administrator of the database. In another embodiment, one or more of the predefined business rules may be defined for all databases (e.g. managed using the database management tool). As an option, the business rules may be defined using the database management tool. Further, the predefined business rules against which the user command is validated may be selected from a larger set of predefined business rules, such as based on their relevancy to a role of the user, a type of database modification specified in the user command, or any other criteria.

In one exemplary embodiment, the predefined business rules may include at least one rule that requires a "where" clause for user commands. In another exemplary embodiment, the plurality of predefined business rules may include at least one rule that requires a latest version of user commands. In yet another exemplary embodiment, the plurality of predefined business rules may include at least one rule that limits a number of rows allowed to be changed by execution of any particular user command. In still yet another exemplary embodiment, the plurality of predefined business rules may include at least one rule that requires a number of rows expected by the user to be changed as a result of executing the user command to match a number of actual rows that will be changed as a result of executing the user command. As an option, the number of rows expected by the user to be changed as a result of executing the user command may be input by the user in association with the user command.

In operation 106, one or more actions are conditionally performed before executing the user command, based on a result of the validating. The one or more actions may be performed when a result of the validating indicates that the user command does not comply with one or more of the predefined business rules. The actions that are performed may correspond to (e.g. be predefined for) those predefined business rules with which the user command does not comply.

Just by way of example, the one or more actions may include issuing an alert (e.g. to the user) describing the predefined business rule with which the user command does not comply, and optionally requiring user acceptance of the non-compliance before executing the user command. As another example, the one or more actions may include issuing a suggestion (e.g. the user) for modifying the user command to make the user command comply with the predefined business rule with which the user command does not currently comply. As yet another example, the one or more actions may include preventing execution of the user command.

In one exemplary embodiment when the result of the validating indicates that the user command does not include a required "where" clause, then the one or more actions may include issuing an alert that the missing "where" clause will cause the user command to impact an entire table of the database. Optionally, when the result of the validating indicates that the user command does not include the required "where" clause, then the one or more actions may further include preventing execution of the user command.

In another exemplary embodiment when the result of the validating indicates that the user command does not match a required latest executed version of the user command, then the one or more actions may include issuing an alert that the user command was previously commented or modified. As an option, when the result of the validating indicates that the user command does not match the required latest executed version of the user command, then the one or more actions may further include providing an option to the user to proceed with the latest executed version of the user command (as opposed to the version of the user command received in operation 102).

In yet another exemplary embodiment when the result of the validating indicates that execution of the user command will change a number of rows that exceeds a defined limit, then the one or more actions may include preventing the execution of the user command. As an option, when the result of the validating indicates that the number of rows expected by the user to be changed as a result of executing the user command does not match the number of actual rows that will be changed as a result of executing the user command, then the one or more actions may include issuing an alert (e.g. to the user) indicating the mismatch between the number of rows expected by the user to be changed and the number of actual rows that will be changed. As a further option, when the result of the validating indicates that the number of rows expected by the user to be changed as a result of executing the user command does not match the number of actual rows that will be changed as a result of executing the user command, then the one or more actions may further include preventing the execution of the user command.

To this end, the user command may only be executed (e.g. automatically) to modify the database once the user command has been validated as complying with all of the predefined business rules. When a result of the validating indicate that the user command complies with all of the predefined business rules, then the user command may be automatically executed to modify the database. When only an alert and/or suggestion are provided for one or more predefined business rules with which the user command does not comply, but the actions corresponding to those predefined business rules do not prevent execution of the user command, then the user may be provided an option to still proceed with the execution of the user command even when non-compliant with the predefined business rules. When the user command does not comply with one or more predefined business rules that correspond with an action that prevents execution of the user command, then execution of the user command may be denied (e.g. until a new and/or modified user command is received and method 100 repeats).

This method 100 may be performed to prevent user mistakes when making database changes, such as user mistakes that would otherwise cause modifications (e.g. changes) to the database that are unintended by the user. The user mistakes may be detected via use of the predefined business rules, and responded to in a manner defined for those predefined business rules. The business rules may be predefined according to any requirements of an owner or administrator of the database, for example, focusing on possible parts of the data in the database that are prone to (e.g. numerical, etc.) mistakes and/or areas where a mistake would cause significant harm to the business.

Additional actions may also be performed even once the user command is executed on the database, in order to help protect against unintended database modifications. In one embodiment, rows of the database impacted by the user command may be automatically backed up before committing changes to the rows of the database impacted by the user command (e.g. in a table format), which may allow for the user command to be rolled back if desired.

In another embodiment, an indication of the user command that has been executed may be stored in a history of user commands (e.g. as a "latest" execution version of the user command), for example for audit purposes. In yet another embodiment, a notification may be issued regarding a number of rows impacted by the executed user command.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
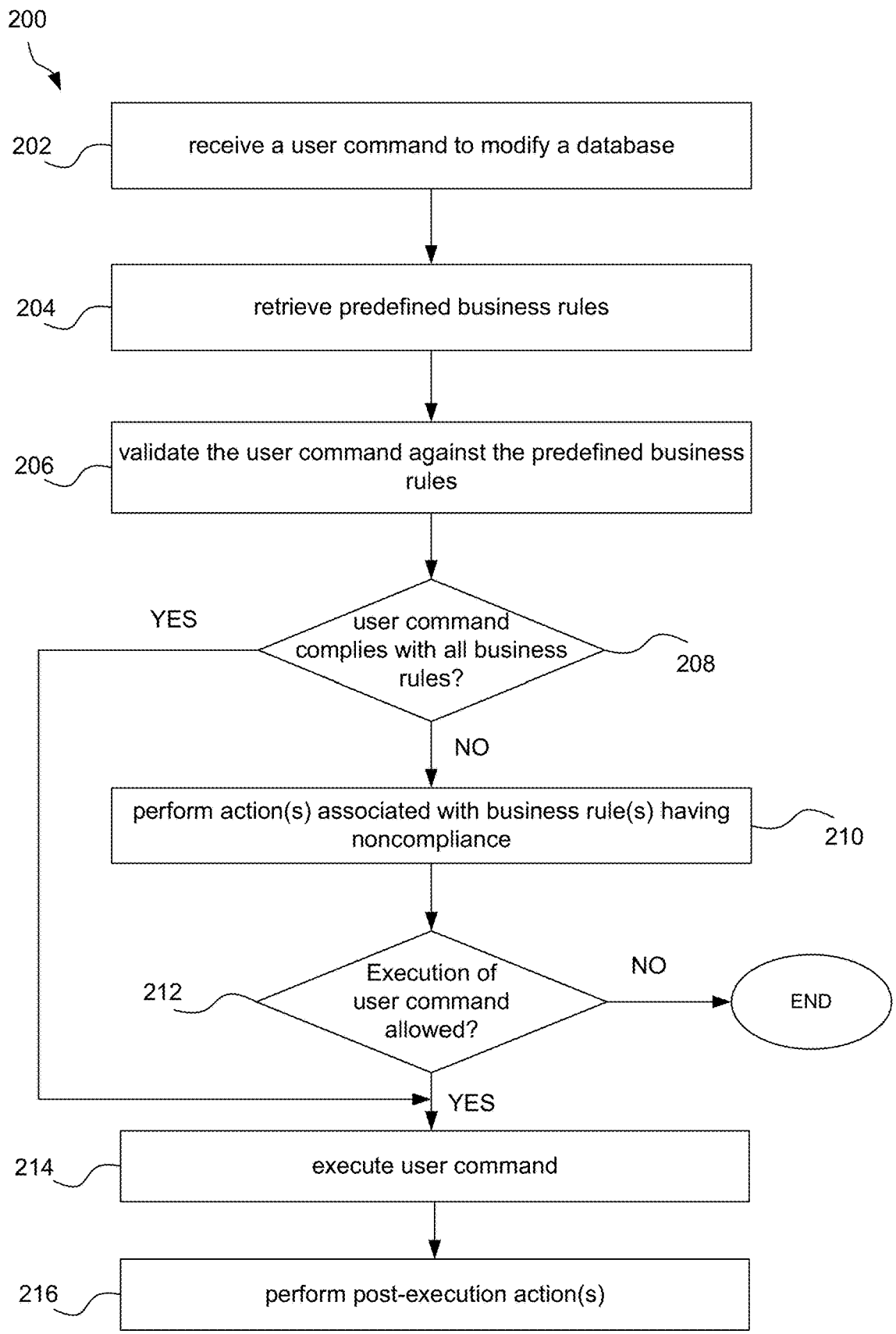
FIG. 2 illustrates a method for mistake proofing database management, in accordance with one embodiment.

FIG. 2 illustrates a method 200 for mistake proofing database management, in accordance with one embodiment. As an option, the method 200 may be carried out in the context of the details of the previous figure and/or any subsequent figure(s). Of course, however, the method 200 may be carried out in the context of any desired environment. Further, the aforementioned definitions may equally apply to the description below.

In operation 202, a user command to modify a database is received (e.g. similar to operation 102 of FIG. 1). Upon receipt, the user command may be validated against syntax-based rules of the under underlying database system. Optionally, the method 200 may only proceed once the user command is determined to comply with all syntax-based rules of the under underlying database system.

In operation 204, predefined business rules are retrieved. The business rules may be retrieved from a database or other data structure storing the business rules. The business rules may be a subset of all business rules, and may be selected per their relevance to the user, user role, user command, etc., as an option.

In operation 206, the user command is validated against the predefined business rules. It is then decided in decision 208 whether the user command complies with all of the predefined business rules. If it is determined in decision 208 that the user command complies with all of the predefined business rules, then in operation 214 the user command is executed.

If it is determined in decision 208 that the user command does not comply with all of the predefined business rules, then in operation 210 actions associated with the predefined business rules having non-compliance are performed.

Figure 3A:
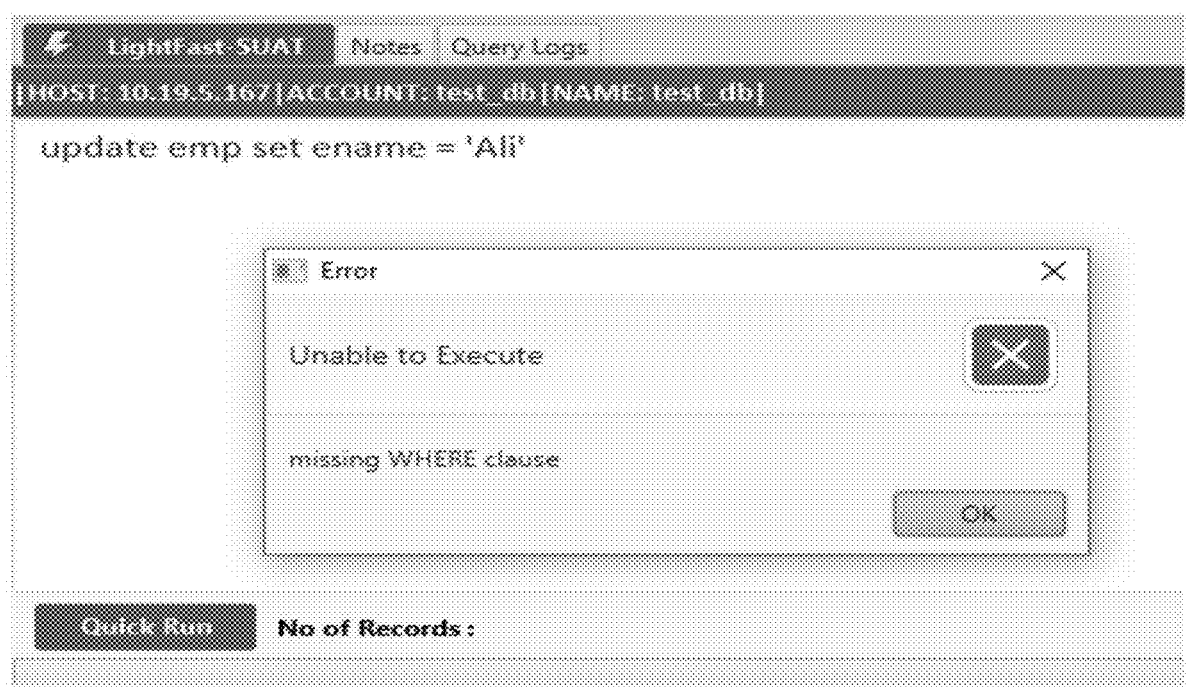
FIGS. 3A-N illustrate exemplary graphical user interface (GUI) of a tool for mistake proofing database management, in accordance with one embodiment.
Figure 3B:
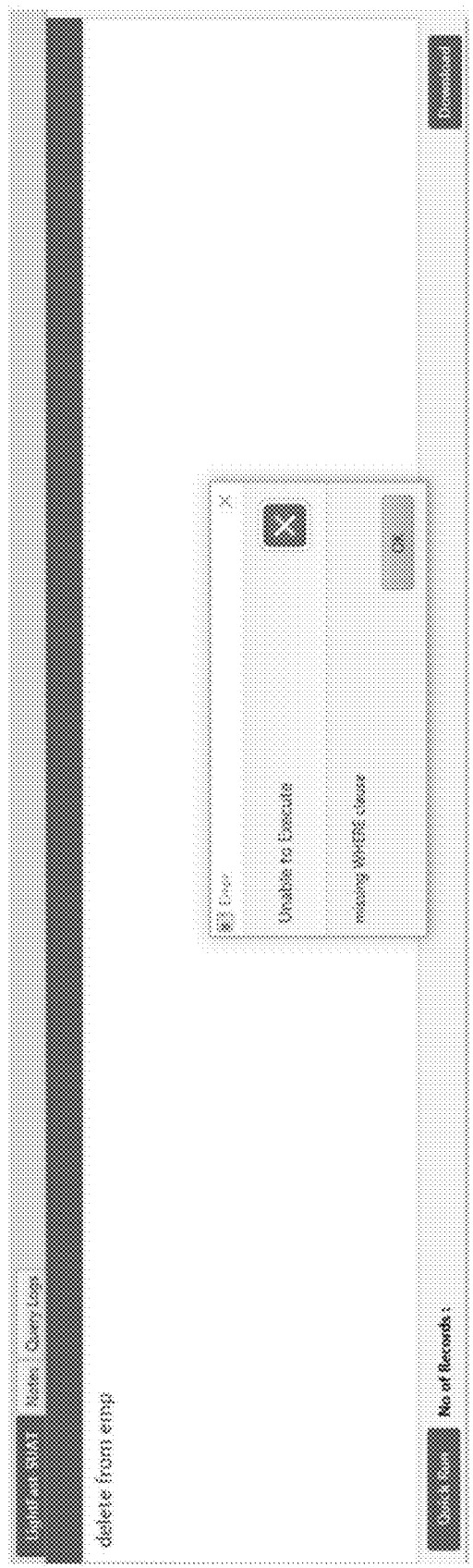

For example, when it is determined in decision 208 that the user command does not include a "where" clause, as required by one of the predefined business rules, then the actions performed may include issuing an alert that the missing "where" clause will cause the user command to impact an entire table of the database and preventing execution of the user command. A GUI illustrating this embodiment related to a missing "where" clause for an update user command is shown by way of example in FIG. 3A. A GUI illustrating this embodiment related to a missing "where" clause for a delete user command is shown by way of example in FIG. 3B.

Figure 3C:
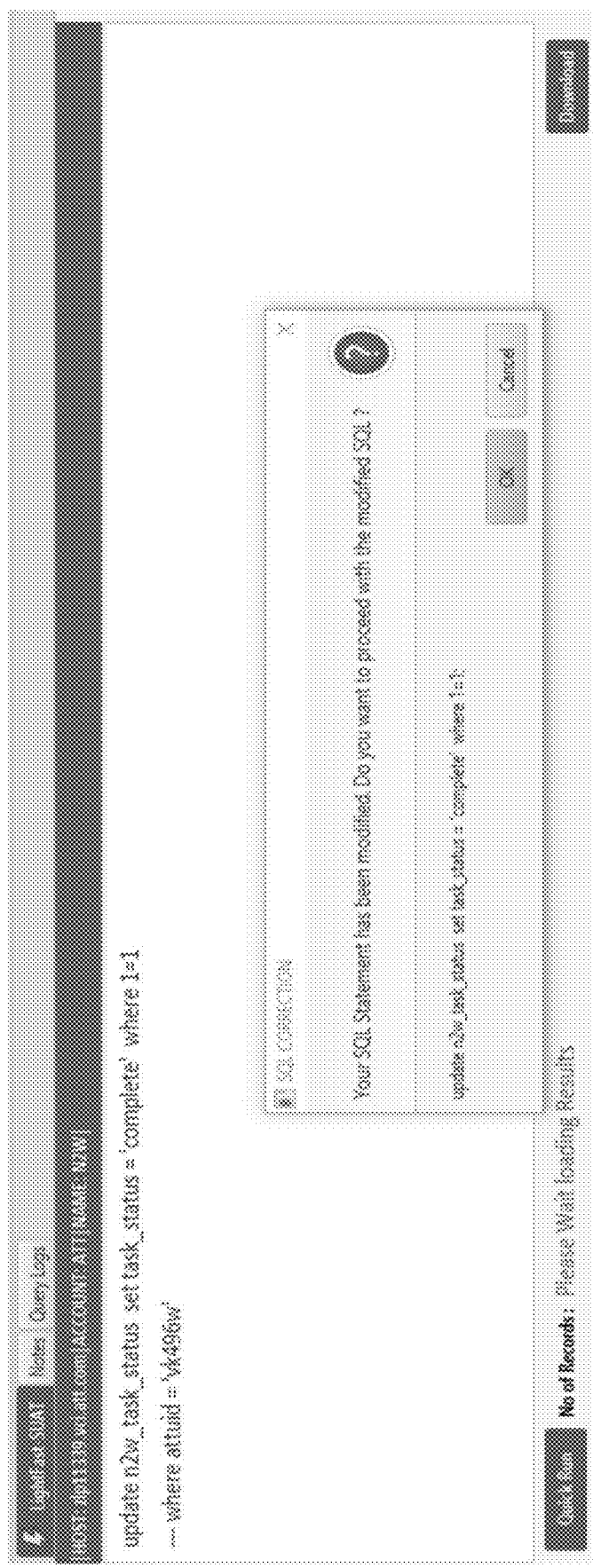

As another example, when it is determined in decision 208 that the user command does not match a latest executed version of the user command, as required by one of the predefined business rules, then the actions performed may include issuing an alert that the user command was previously commented or modified and providing an option to the user to proceed with the latest executed version of the user command. A GUI illustrating this embodiment related to the availability of an updated version of the user command is shown by way of example in FIG. 3C.

As yet another example, when it is determined in decision 208 that the user command will change a number of rows that exceeds a limit, as defined by one of the predefined business rules, then the actions performed may include preventing the execution of the user command.

Figure 3D:
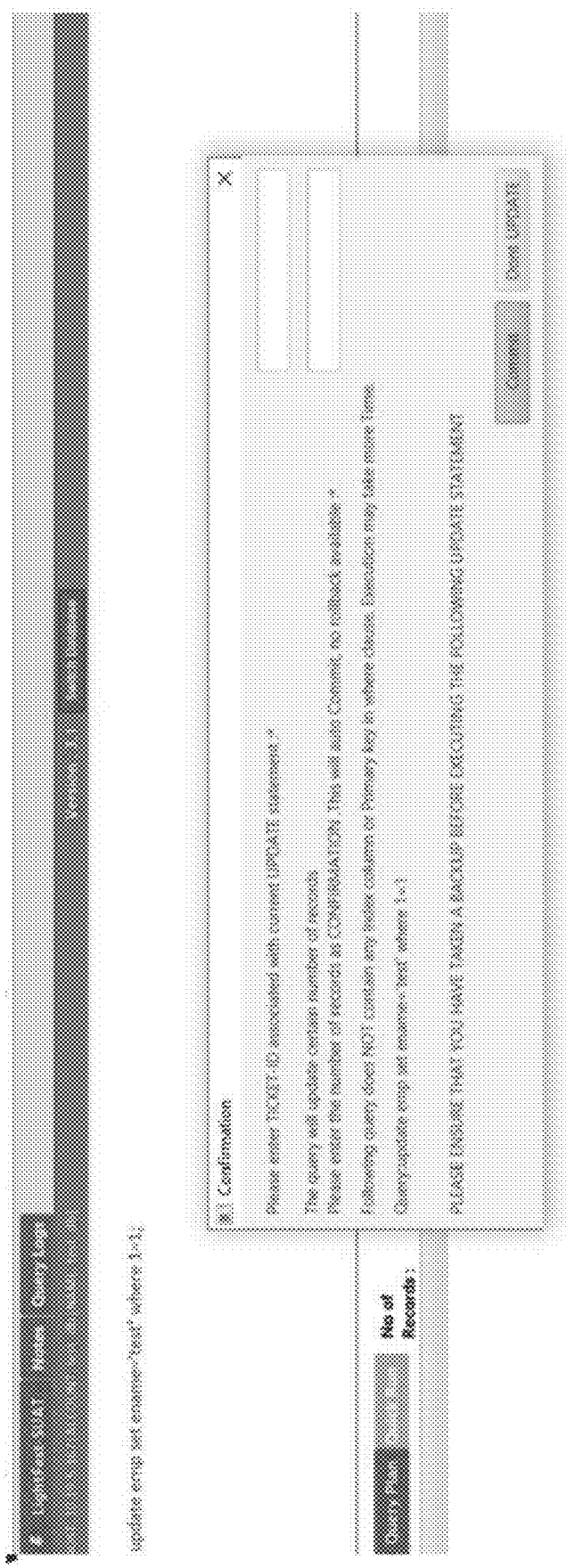
Figure 3E:
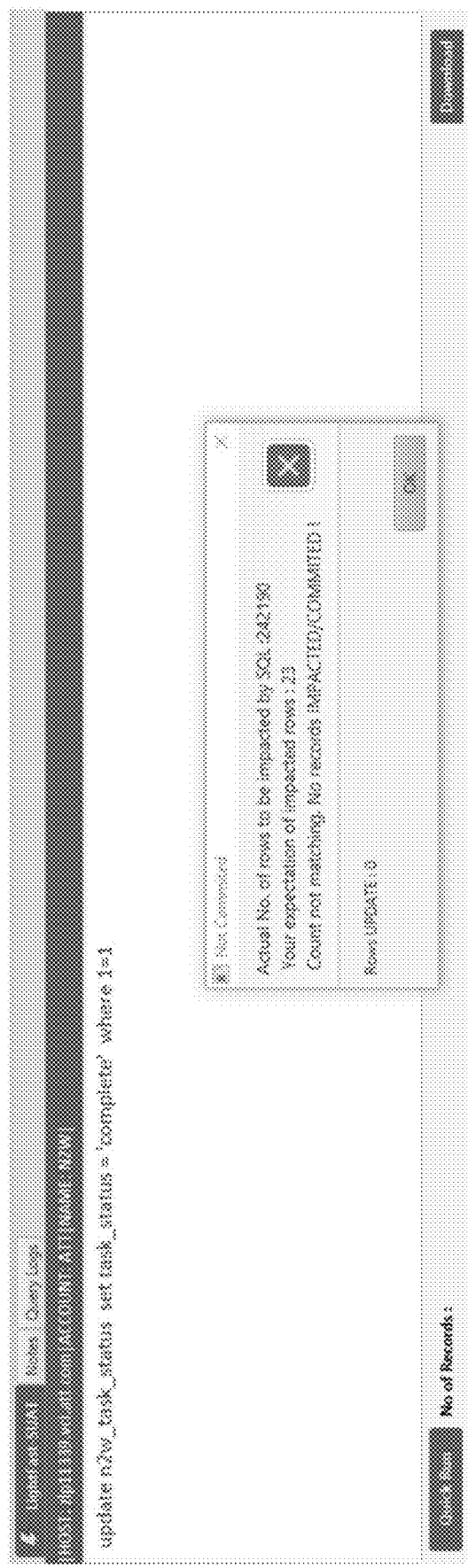
Figure 3F:
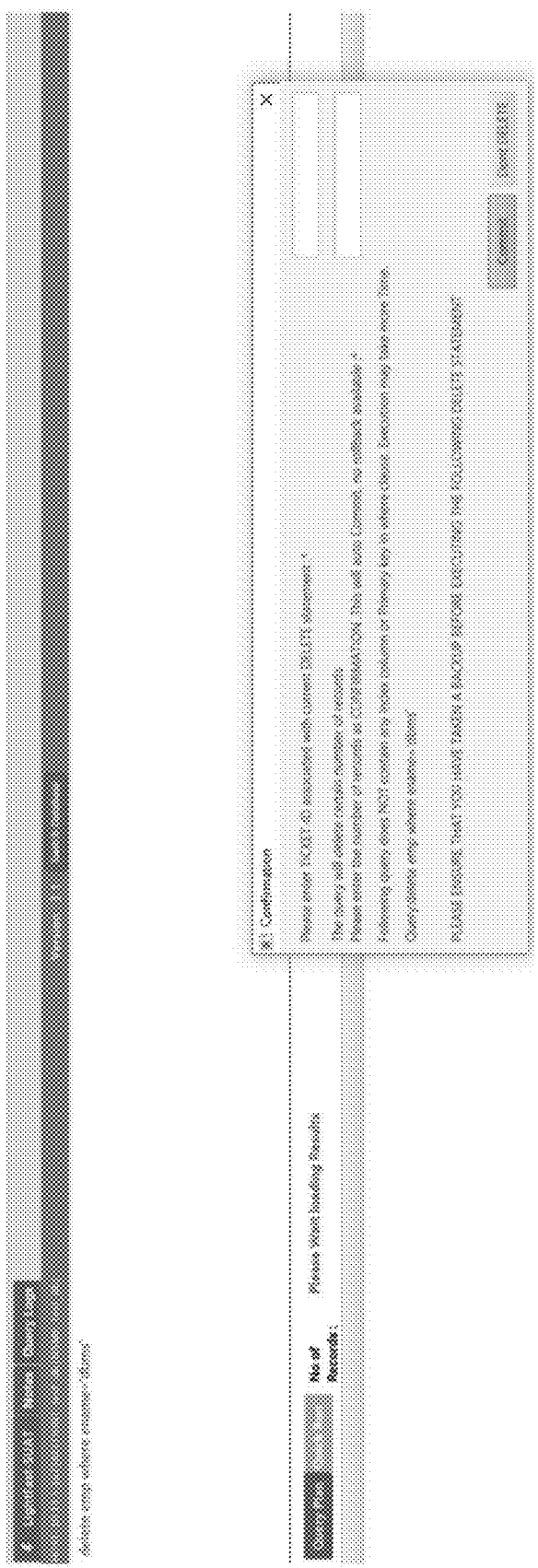

In still yet another example, when it is determined in decision 208 that a number of rows expected by the user to be changed as a result of executing the user command does not match the number of actual rows that will be changed as a result of executing the user command, as otherwise required by one of the predefined business rules, then the actions performed may include issuing an alert (e.g. to the user) indicating the mismatch between the number of rows expected by the user to be changed and the number of actual rows that will be changed and preventing the execution of the user command. A GUI illustrating this embodiment related to user entry of an expected number of effected rows for an update user command is shown by way of example in FIG. 3D. A GUI illustrating this embodiment related to a mismatch between the number of rows expected by the user to be changed (as input in the GUI of FIG. 3D) and the number of actual rows that will be changed is shown by way of example in FIG. 3E. A GUI illustrating this embodiment related to user entry of an expected number of effected rows for a delete user command is shown by way of example in FIG. 3F.

Figure 3G:
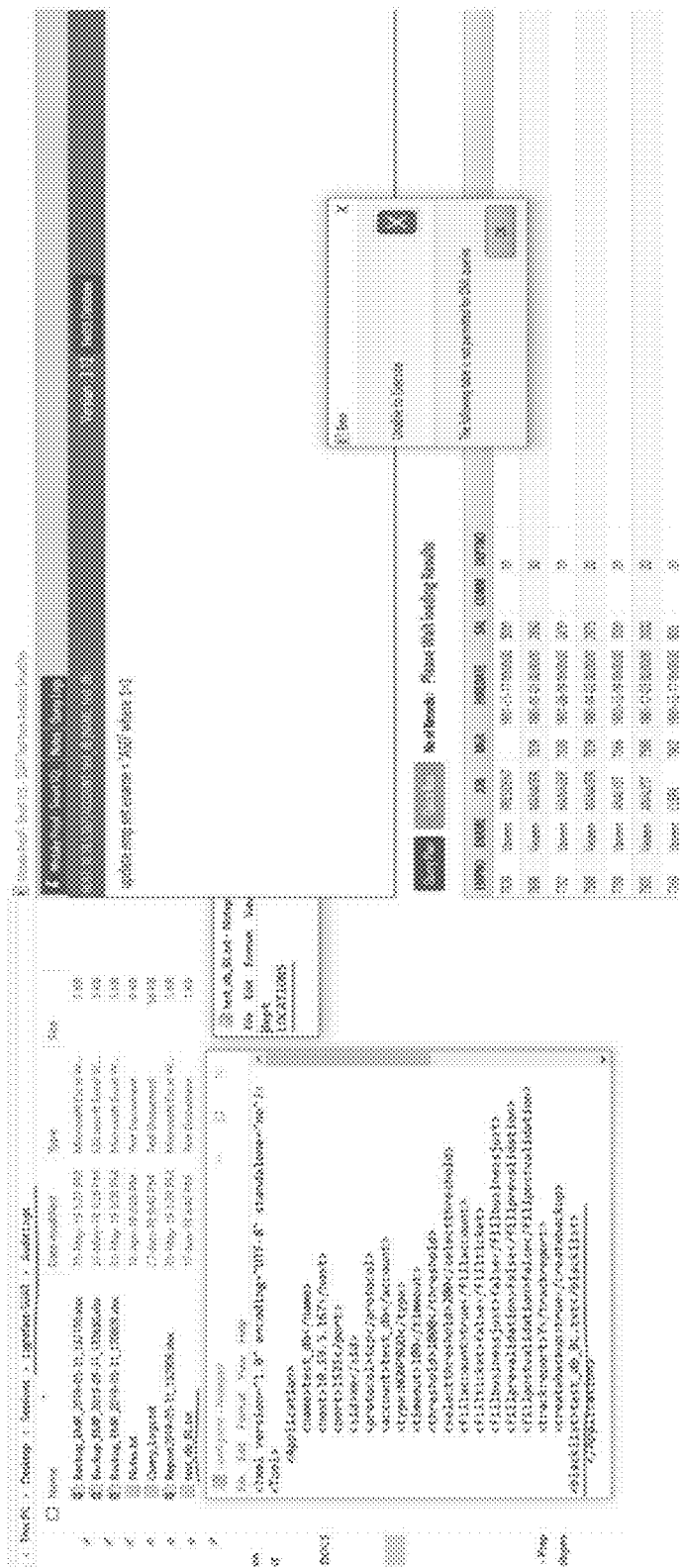

In a further example, when it is determined in decision 208 that that the user command is to modify a table that has been blacklisted (i.e. for which modifications are not allowed), then the actions performed may include issuing an alert (e.g. to the user) indicating that the user command is not allowed and preventing the execution of the user command. A GUI illustrating this embodiment related to a blacklisted table is shown by way of example in FIG. 3G.

It is then determined in decision 212 whether execution of the user command is allowed. For example, it may be determined whether any of the predefined business rules with which the user command is non-compliant prevent execution of the user command, then the user command is executed (see operation 214). If any of the predefined business rules with which the user command is non-compliant prevent execution of the user command, then the method 200 may end, for example until the user modifies the user command (e.g. as an input of a new user command) and the method 200 repeats. Of course, other embodiments are also contemplated where the entire method 200 does not necessarily repeat when the user command is modified (e.g. to comply with the particular business rules with which the user command is otherwise non-compliant), but instead the modified user command validated only against those particular business rules.

Figure 3H:
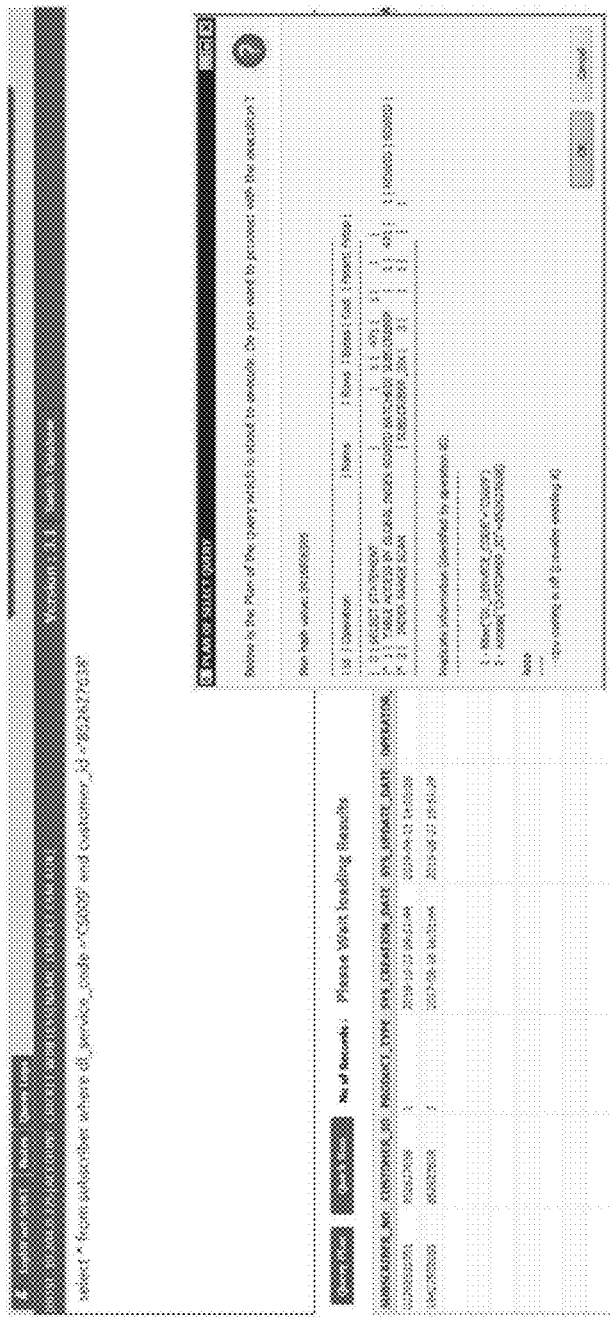

As an option, a plan for the user command may be provided to the user prior to execution of the user command. The user may be required to accept the plan in order for the user command to be automatically executed. A GUI illustrating this embodiment related to presenting the plan for the user command, for user acceptance, is shown by way of example in FIG. 3H.

Figure 3I:
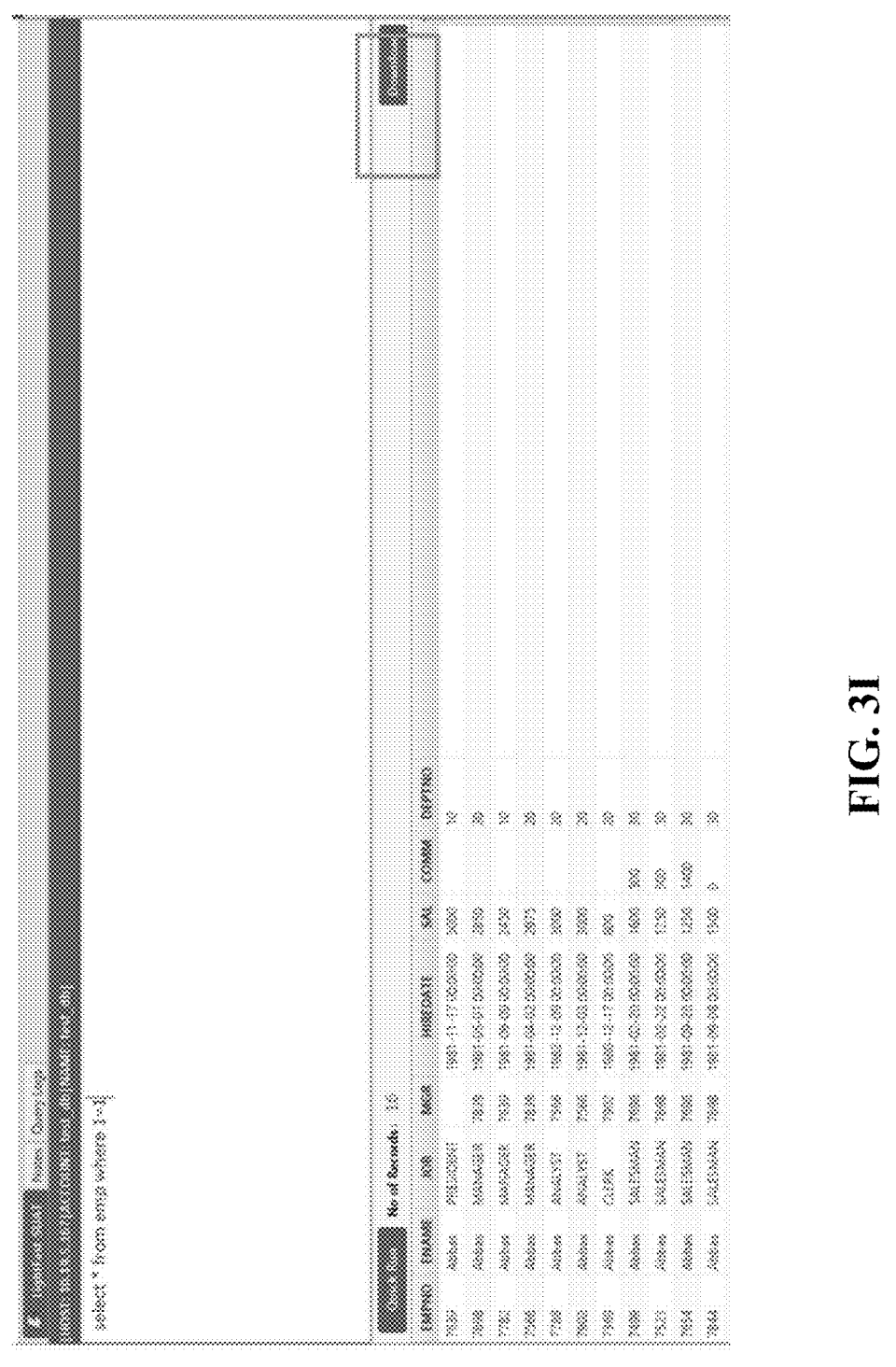

As also shown, in operation 216, one or more post-execution actions are performed. In one embodiment, the post-execution actions may include downloading a search result of a query associated with the user command. A GUI illustrating this embodiment related to the downloaded search result is shown by way of example in FIG. 3I.

Figure 3J:
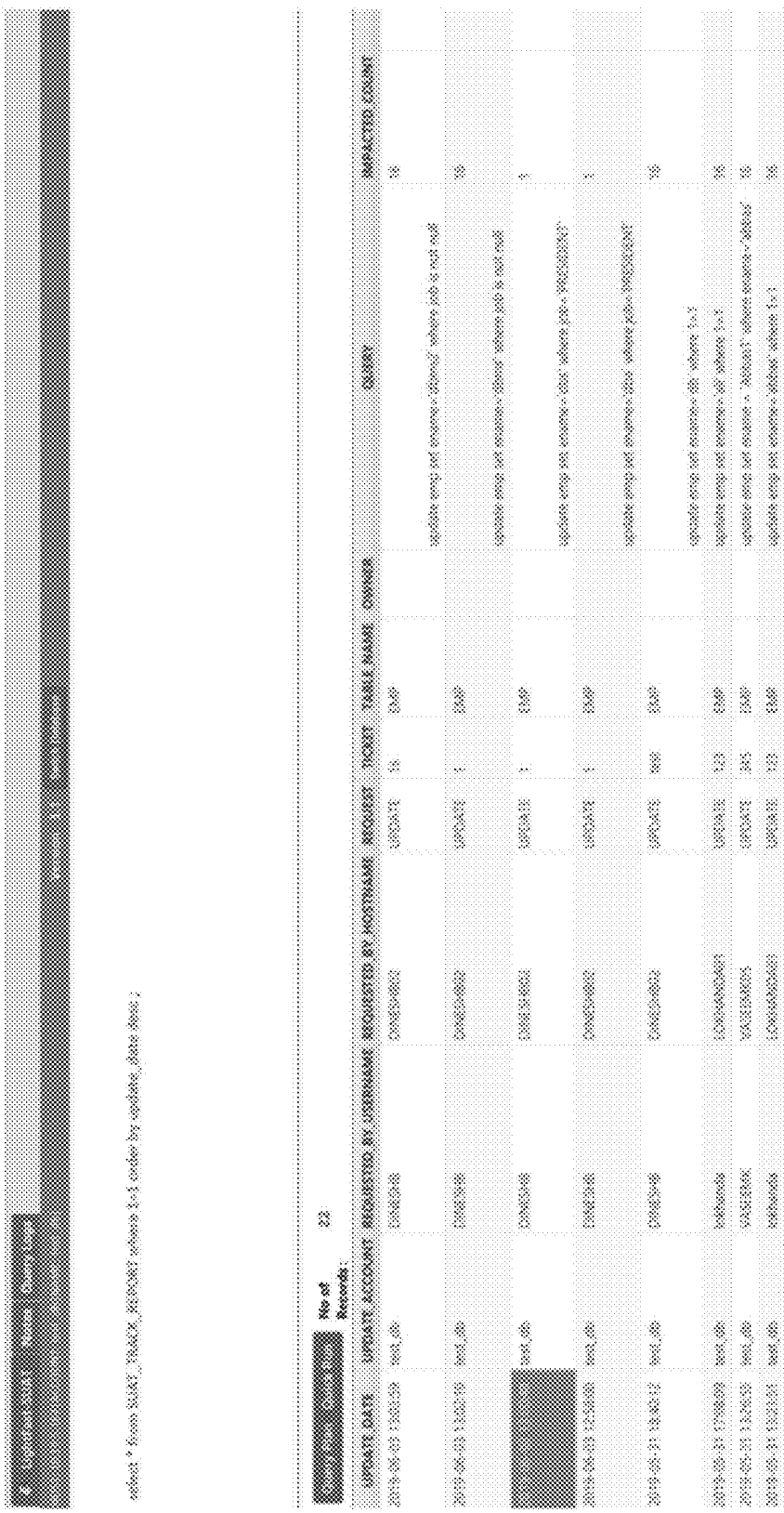
Figure 3K:
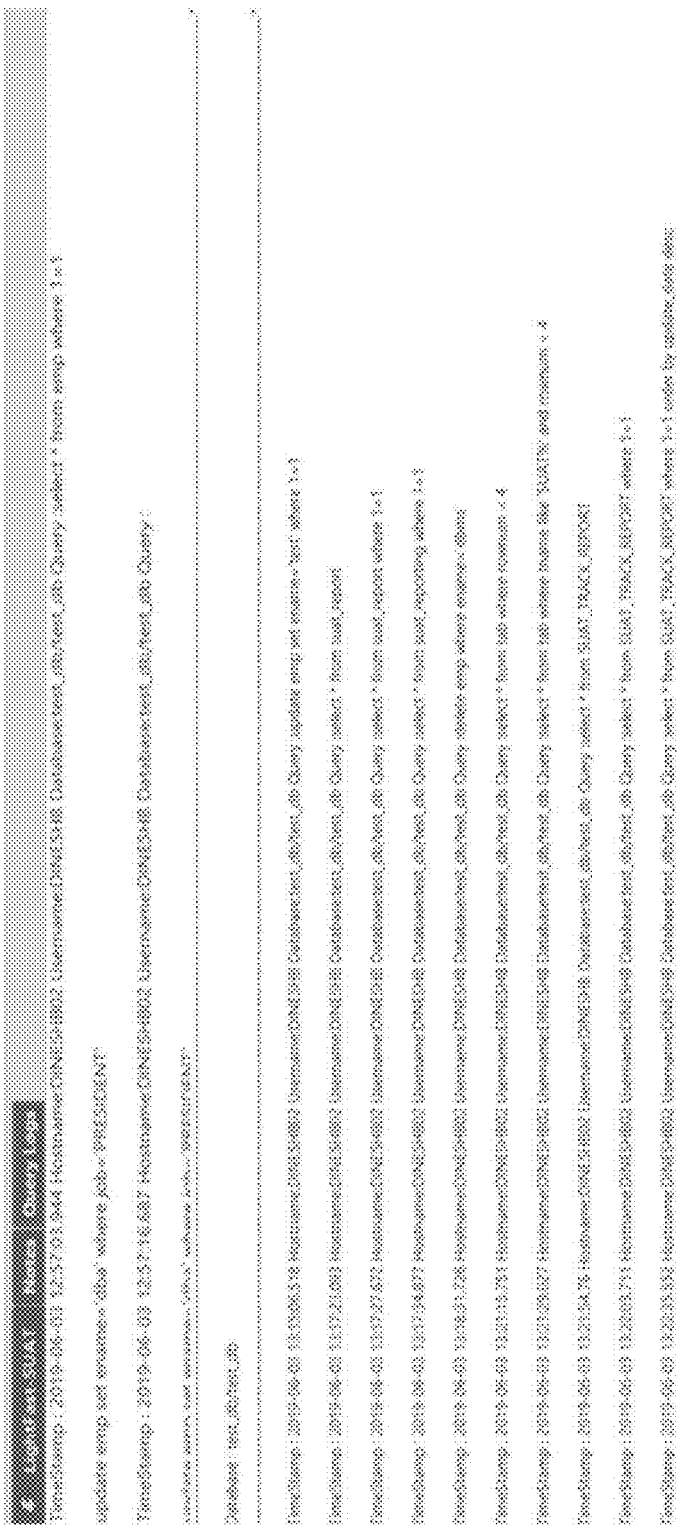

In another embodiment, the post-execution actions may include tracking, in a table, the changes made to the database by the user command. A GUI illustrating this embodiment related to the tracked changes in a table is shown by way of example in FIG. 3J. In yet another embodiment, the post-execution actions may include tracking, in an audit log, the changes made to the database by the user command. A GUI illustrating this embodiment related to the tracked changes in an audit log is shown by way of example in FIG. 3K.

Figure 3L:

In still yet another embodiment, the post-execution actions may include adding the user command to a "frequently used" list made available to the user. A GUI illustrating this embodiment related to the "frequently used" list (i.e. in a "notes" tab) is shown by way of example in FIG. 3L.

Figure 3M:
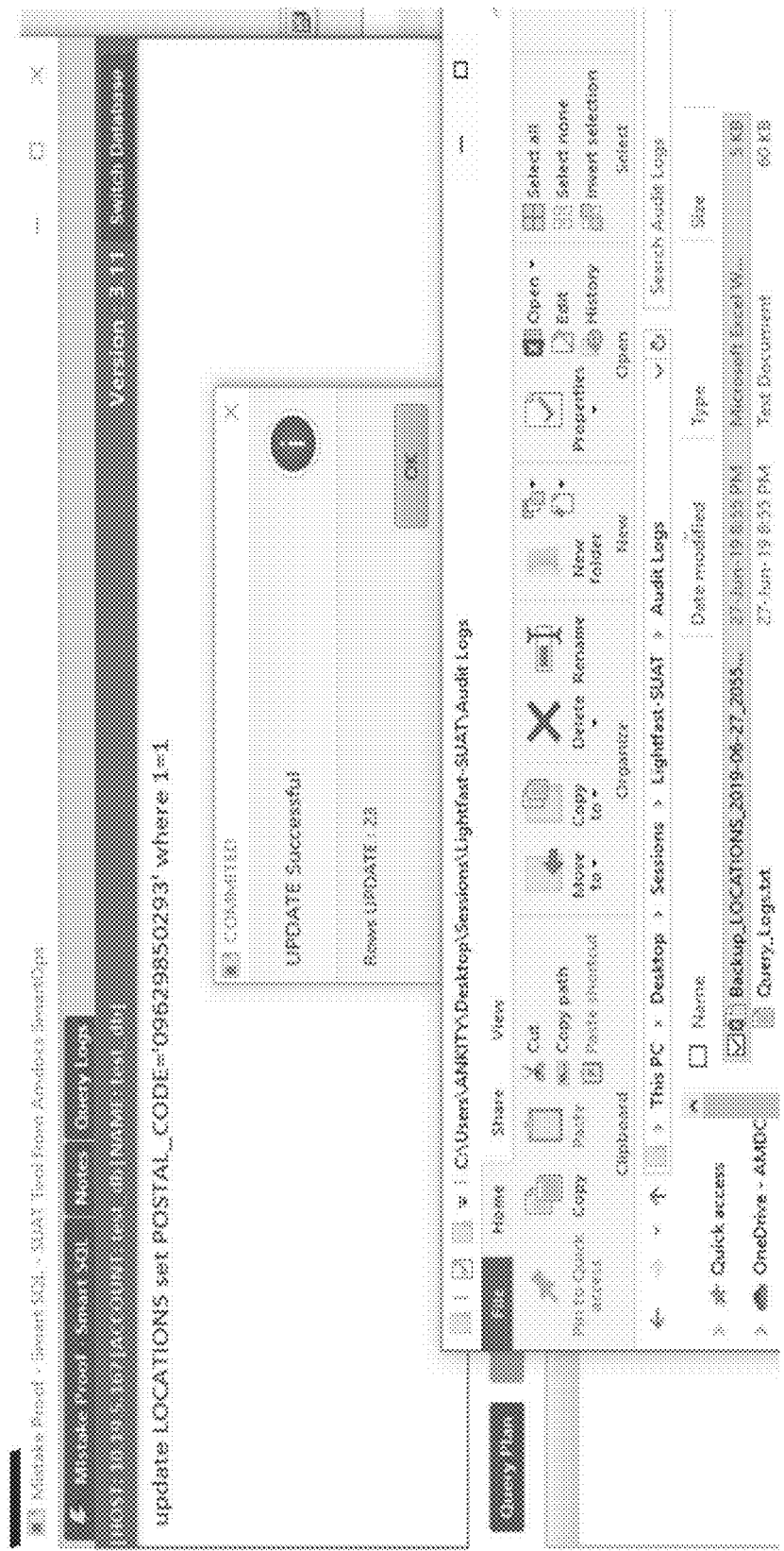

In a further embodiment, the post-execution actions may include backing up tables effected by the user command, prior to committing the changes made by the user command. A GUI illustrating this embodiment related to the backed up tables is shown by way of example in FIG. 3M.

Figure 3N:
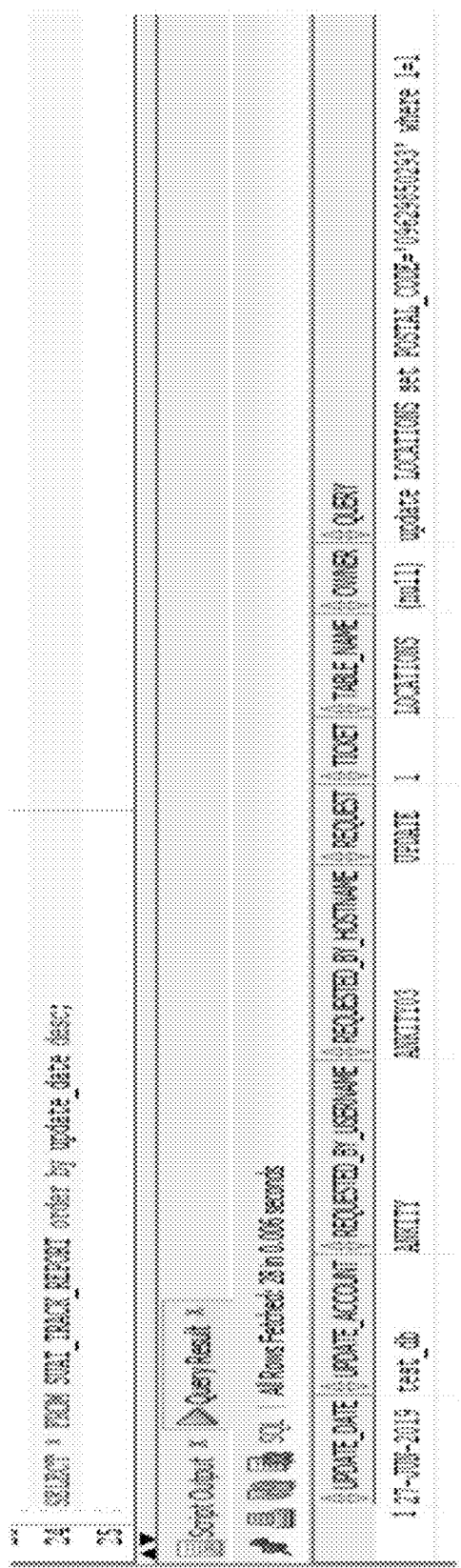

In yet a further embodiment, the post-execution actions may include creating a report for tracking the executed user command. A GUI illustrating this embodiment related to the report is shown by way of example in FIG. 3N.

To this end, the method 200 will give a controlled environment to a user which will check for any gap in the user's understanding of the impact to the database versus an actual impact to the database. The method 200 will also provide an error free, mistake proofing process. In an embodiment, the method 200 may only allow the user to proceed further with the actual changes in the database only if there is no gap, otherwise an error may be thrown and the changes restricted.

Figure 4:
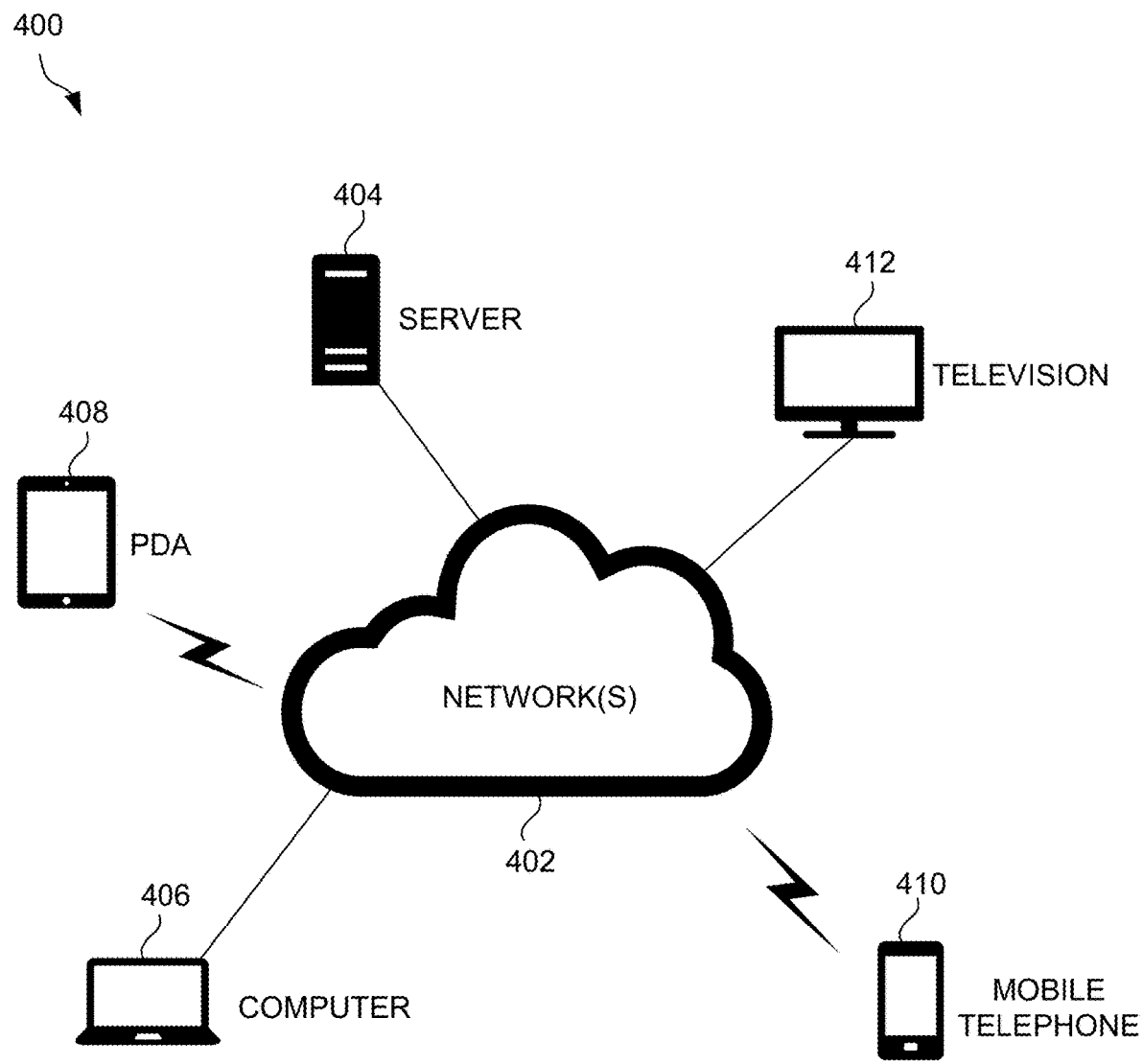
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
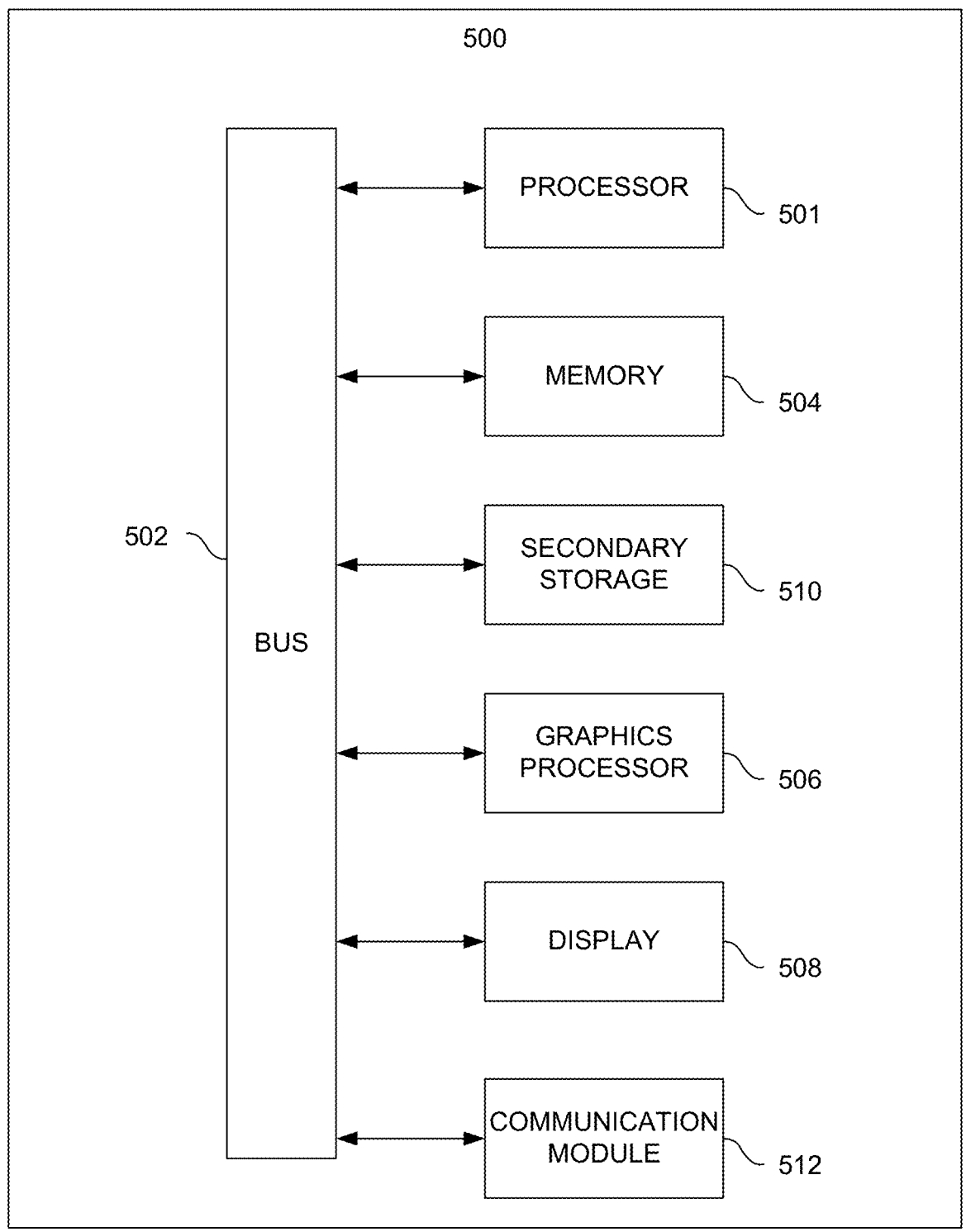
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:
    receive a user command to modify a database;
    validate the user command against a plurality of predefined business rules, wherein the plurality of predefined business rules include at least one of:
        at least one rule that requires a latest version of user commands, or
        at least one rule that requires a number of rows expected by the user to be changed as a result of executing the user command to match a number of actual rows that will be changed as a result of executing the user command; and
    perform one or more actions before executing the user command, based on a result of the validating.

2. The non-transitory computer-readable media of claim 1, wherein a syntax of the user command is validated before validating the user command against the plurality of predefined business rules.

3. The non-transitory computer-readable media of claim 1, wherein the plurality of predefined business rules further include at least one rule that requires a "where" clause for user commands.

4. The non-transitory computer-readable media of claim 3, wherein when the result of the validating indicates that the user command does not include a "where" clause, then the one or more actions include issuing an alert that the user command that the missing "where" clause will cause the user command to impact an entire table of the database.

5. The non-transitory computer-readable media of claim 4, wherein when the result of the validating indicates that the user command does not include a "where" clause, then the one or more actions further include preventing execution of the user command.

6. The non-transitory computer-readable media of claim 1, wherein the plurality of predefined business rules include the at least one rule that requires the latest version of user commands.

7. The non-transitory computer-readable media of claim 6, wherein when the result of the validating indicates that the user command does not match a latest executed version of the user command, then the one or more actions include issuing an alert that the user command was previously commented or modified.

8. The non-transitory computer-readable media of claim 7, wherein when the result of the validating indicates that the user command does not match a latest executed version of the user command, then the one or more actions further include providing an option to the user to proceed with the latest executed version of the user command.

9. The non-transitory computer-readable media of claim 1, wherein the plurality of predefined business rules further include at least one rule that limits a number of rows allowed to be changed by execution of any particular user command.

10. The non-transitory computer-readable media of claim 9, wherein when the result of the validating indicates that execution of the user command will change a number of rows that exceeds the limit, then the one or more actions include preventing the execution of the user command.

11. The non-transitory computer-readable media of claim 1, wherein the plurality of predefined business rules include the at least one rule that requires the number of rows expected by the user to be changed as the result of executing the user command to match the number of actual rows that will be changed as the result of executing the user command.

12. The non-transitory computer-readable media of claim 11, wherein the number of rows expected by the user to be changed as a result of executing the user command are input by the user in association with the user command.

13. The non-transitory computer-readable media of claim 12, wherein when the result of the validating indicates that the number of rows expected by the user to be changed as a result of executing the user command does not match the number of actual rows that will be changed as a result of executing the user command, then the one or more actions include issuing an alert indicating the mismatch between the number of rows expected by the user to be changed and the number of actual rows that will be changed.

14. The non-transitory computer-readable media of claim 13, wherein when the result of the validating indicates that the number of rows expected by the user to be changed as a result of executing the user command does not match the number of actual rows that will be changed as a result of executing the user command, then the one or more actions further include preventing the execution of the user command.

15. The non-transitory computer-readable media of claim 1, wherein the one or more actions include at least temporarily preventing execution of the user command.

16. The non-transitory computer-readable media of claim 1, further comprising:
when the user command is executed, automatically back up rows of the database impacted by the user command before committing changes to the rows of the database impacted by the user command.

17. The non-transitory computer-readable media of claim 1, further comprising:
when the user command is executed, store an indication of the user command in a history of user commands.

18. The non-transitory computer-readable media of claim 1, further comprising:
when the user command is executed, issue a notification of a number of rows impacted by the user command.

19. A method, comprising:
at a computer system:
receiving a user command to modify a database;
validating the user command against a plurality of pre-defined business rules, wherein the plurality of pre-defined business rules include at least one of:
at least one rule that requires a latest version of user commands, or
at least one rule that requires a number of rows expected by the user to be changed as a result of executing the user command to match a number of actual rows that will be changed as a result of executing the user command; and
performing one or more actions before executing the user command, based on a result of the validating.

20. A system, comprising:
a non-transitory memory storing instructions; and
one or more processors in communication with the non-transitory memory that execute the instructions to:
receive a user command to modify a database;
validate the user command against a plurality of pre-defined business rules;
perform one or more actions before executing the user command, based on a result of the validating; and
when the user command is executed, at least one of:
automatically back up rows of the database impacted by the user command before committing changes to the rows of the database impacted by the user command, or
issue a notification of a number of rows impacted by the user command.

* * * * *